United States Patent [19]

Kerrigan et al.

[11] Patent Number: 5,094,873
[45] Date of Patent: Mar. 10, 1992

[54] PROCESS OF MAKING A NON-FAT NATURAL CHEESE

[75] Inventors: Gary L. Kerrigan, Wheeling; Alice A. Heth, Evanston; Alan C. Hamann, Northbrook, all of Ill.

[73] Assignee: Kraft General Foods, Inc., Glenview, Ill.

[21] Appl. No.: 639,990

[22] Filed: Jan. 11, 1991

Related U.S. Application Data

[63] Continuation-in-part of Ser. No. 567,281, Aug. 14, 1990, abandoned.

[51] Int. Cl.⁵ .............................................. A23C 20/00
[52] U.S. Cl. ..................................... 426/582; 426/39; 426/573; 426/588
[58] Field of Search ................ 426/582, 588, 573, 39, 426/40, 42, 43

[56] References Cited

U.S. PATENT DOCUMENTS

| | | | |
|---|---|---|---|
| 4,066,791 | 1/1978 | Corbin, Jr. | 426/588 |
| 4,143,175 | 3/1979 | Whelan et al. | 426/582 |
| 4,379,175 | 4/1983 | Baker | 426/582 |

Primary Examiner—Donald E. Czaja
Assistant Examiner—H. Pratt
Attorney, Agent, or Firm—Fitch, Even, Tabin & Flannery

[57] ABSTRACT

The present invention is directed to a non-fat natural cheese which is made from a first liquid non-fat milk solids substrate which is made into cheese by various known methods. In the method for making the substrate, a non-fat milk solids source, such as skim milk, is acidified to a pH below the isoelectric point. A blend of the acidified non-fat milk solids source and gum is then prepared. The blend is then subjected to high pressure homogenization to provide a dispersion of the gum in the casein of the non-fat milk solids source. Alternatively, the gum may be dispersed in water and be subjected to high pressure homogenization prior to blending the gum with the acidified skim milk. In this embodiment, only mild low shear mixing is required to provide a dispersion of the gum in the casein of the non-fat milk solids source. The casein/gum dispersion is then combined with a second non-fat milk solids source to provide a non-fat milk solids substrate. The substrate can then be used to prepare non-fat natural cheese by various known methods.

58 Claims, 4 Drawing Sheets

PROCESS OF MAKING A NON-FAT NATURAL CHEESE

CROSS REFERENCE TO RELATED APPLICATION

This application is a continuation-in-part of application Ser. No. 567,281 filed Aug. 14, 1990 now abandoned.

The present invention relates to the manufacture of natural cheese from a non-fat milk source. More particularly, the present invention relates to a process for the manufacture of non-fat natural cheese from a non-fat milk solids source, such as skim milk, wherein a portion of the skim milk is blended with a gum and treated under conditions conducive to forming a uniform dispersion of the gum throughout the casein of the skim milk. The treated portion of skim milk is combined with additional untreated non-fat milk solids source, such as skim milk, to provide a non-fat milk solids substrate suitable for the manufacture of natural cheese.

BACKGROUND OF THE INVENTION

Natural cheese is the term used in the cheese making art to describe varieties of cheese which are made from various milk sources, such as whole milk and milk adjusted to various fat levels with cream, wherein the milk source is set, either by microorganisms alone or by a combination of microorganisms and a milk coagulating enzyme, such as rennet, and which involves a whey drainage step. Well known examples of natural cheese are Swiss cheese, American-type cheeses, such as Cheddar cheese, Colby cheese, stirred curd cheese, washed curd cheese and the Pasta filata cheeses, such as Mozzarella, Provolone and Scamorze.

In accordance with the present invention, a treated non-fat milk solids substrate is provided which can be used in any of the well known natural cheese make procedures to provide a non-fat natural cheese with texture, taste and organoleptic properties similar to that of natural cheese made with milk containing fat. Typical examples of natural cheese processes are those for Swiss cheese, stirred curd Cheddar cheese and Mozzarella cheese, which are described hereinbelow.

In the manufacture of Swiss cheese, three species of bacteria have conventionally been used as starters during a fermentation period: these being a coccus culture, a rod culture and a propionic acid forming microorganism. Usually, *Streptococcus thermophillus* is used as the coccus culture; *Lactobacillus bulgaricus* or *Lactobacillus helveticus* is used as the rod culture; and *Propionibacterium shermanii* is used as the propionic acid-forming microorganism. A milk clotting enzyme, such as rennet, is also used and added in an amount such that curd firm enough to cut is formed in about 30 minutes. The fermentation proceeds at a temperature of from about 88° F. to about 94° F. Curd is cut and worked for about 30 minutes to an hour. The curd is then heated over a period of about 30 minutes to a cooking temperature of between 120° F. and 128° F. The curd is stirred at the cooking temperature for about 30 minutes to an hour. The curd is pressed under the whey, and the whey is then removed. The curd is pressed into blocks for curing to produce Swiss cheese with typical eye formation. The time required for fermentation, working and cooking is usually less than 3 hours.

In the manufacture of Cheddar cheese by the stirred curd method, milk is pasteurized at a temperature of 162°–164° F. for a holding time of 16 to 18 seconds. The milk is introduced into a cheese vat and a lactic starter, such as *S. lactis,* is added to the vat. Fermentation and ripening takes place at a temperature of 87° to 88° F. for a period of about 60 minutes. Rennet is added and coagulation occurs in a further 30 minutes. The curd is cut into particles over a period of about 15 minutes and is then cooked at a temperature of 101° F. to 103° F. for 30 minutes. The curd is stirred out in the whey for a period of 30 to 75 minutes. The curd and whey are then transferred to a drain table, where the whey drains over a period of about 30 minutes. The curd on the drain table is sprayed with water at a temperature of 105° F. for a period of 2 to 4 minutes. Salt is added and the curd is allowed to rest on the drain table for a period of about 10 minutes. The curd is then transferred to a container, usually a 640 pound container, where the curd is pressed under vacuum for a period of 75 minutes. The 640 pound block of Cheddar curd is then transferred to a cooler after a resting period of about 24 hours. The curd is held in the cooler at a temperature of 40° F. for 10 days and is then cured an additional period of 21–45 days at a temperature of 40° F. to 45° F.

Pasta filata cheeses, such as Mozzarella, have traditionally been made by a process wherein the curd is pulled or stretched under hot water or hot whey by use of a paddle or by hand. Modern high production techniques for manufacture of such cheeses, however, utilize an inclined twin auger screw for transporting and stretching the curd under hot water to produce the cheese. In a typical process for manufacture of Mozzarella cheese, milk or partially skimmed milk at a temperature of about 88° F. is acidified to a pH of 5.2–5.5, usually by the addition of acetic acid. The milk is then set to provide a coagulum by the addition of rennet and calcium chloride. The coagulum is cut to provide curd and whey and the curd can be cooked in the whey at a temperature of up to 110° F. The curd is usually stirred in the whey for a period of 15 to 45 minutes. The curd is allowed to settle and the whey is drained. The curd is then milled and transferred to an inclined, twin auger conveyor-cooker, where it is transported and worked under hot water maintained at a temperature of 130° F. to 160° F. over a period of from 30 seconds to 2 minutes. The worked curd is molded into desired shapes, which are then placed in brine for a period of 1–12 hours to provide the Mozzarella cheese. The Mozzarella cheese is then packaged for distribution.

The term "natural cheese" is to be distinguished from the term "processed cheese". Processed cheese generally refers to a class of cheese products which are produced by comminuting, mixing and heating lots of natural cheese into a homogeneous plastic mass. The comminuted cheese is blended and sent to cookers or the like which commonly heat the mass to a temperature of 165° F. to 185° F. During cooking, fat is stabilized with the protein and water by the addition of emulsifying salts, such as citrate or phosphate salts, usually at about a 3% level. The salts cause the protein to become more soluble. Under these circumstances, a stable emulsion of protein, fat and water occurs to provide a smooth, homogeneous mass. The hot mass is packaged directly or formed into slices and packaged. In the United States, Standards of Identity apply to classes of processed cheese and are established by the Food and Drug Administration (FDA). Certain of these classes can contain various additives, such as cream, milk, skim milk, buttermilk, cheese whey and skim milk cheese. The moisture content of processed cheese under the Standards of Identity may range from less than 40% to 60%, and the fat content may range from 20% to 35%. The pH range for processed cheese products typically is between 5.0 and 6.5.

While methods are known for making process cheese from skim milk, there has been substantial technical effort directed to methods for producing a natural cheese from a non-fat milk solids source, such as skim milk. It has been proposed to produce non-fat cheese from skim milk by subjecting the skim milk to membrane processes to increase the solids level of the skim milk, followed by evaporation processes to produce a substrate having the required level of solids to produce a natural cheese. The production of a natural cheese from skim milk, however, is complicated by the fact that the fat is no longer present in the protein matrix. Cheese has a protein matrix which is broken up by fat particles. When the fat particles are not present, the cheese protein matrix becomes very firm and the texture and feel of the cheese is completely different from that normally associated with natural cheese.

Figure 1:
FIG. 1 is a microphotograph of the substrate made from the blend of non-fat milk solids sources and xanthan gum prior to high shear, high energy mixing.

Accordingly, it is a principal object of the present invention to provide a non-fat natural cheese which has taste, texture and organoleptic properties substantially similar to that of natural cheese made from milk containing fat.

It is another object of the present invention to provide a non-fat milk solids substrate which can be used to prepare natural cheese by known methods.

It is a further object of the present invention to provide a method for manufacture of cheese from the non-fat milk solids substrate of the invention which provides a natural cheese with desirable flavor and texture properties.

These and other objects will become more apparent from the following description and the appended claims.

SUMMARY OF THE INVENTION

The present invention is directed to a non-fat natural cheese which is made from a first non-fat milk solids substrate which is made into cheese by various known methods. In the method for making the substrate, a non-fat milk solids source, such as skim milk, is acidified to a pH below the isoelectric point. A blend of the acidified non-fat milk solids source and gum is then prepared. The blend is then subjected to high pressure homogenization to provide a dispersion of the gum in the casein of the non-fat milk solids source. Alternatively, the gum may be dispersed in water and then subjected to high pressure homogenization prior to blending the gum with the acidified skim milk. In this embodiment, only mild, low shear mixing is required to provide a dispersion of the gum in the casein of the non-fat milk solids source. The casein/gum dispersion is then combined with a second non-fat milk solids source to provide a non-fat milk solids substrate. The substrate can then be used to prepare non-fat natural cheese by various known methods.

In an important embodiment of the present invention, a modified Swiss cheese make procedure is used to prepare the natural cheese from the substrate of the invention. In this embodiment, the substrate is inoculated with Swiss cheese cultures other than the propionic acid producing culture. That is, a coccus culture and a rod culture are used in the proportions normally used in the manufacture of Swiss cheese. The Swiss cheese make procedure is further modified in that the use of lower stir-out temperatures can be used. This procedure produces a cheese having a texture, flavor and organoleptic properties similar to that of an American-type cheese, but has a reduced bitterness when compared to natural cheeses produced from the substrate of the invention using American-type cheese manufacturing procedures.

DETAILED DESCRIPTION OF THE INVENTION

The present invention is directed to a method for making a non-fat milk solids substrate suitable for manufacture of non-fat natural cheese. In this connection, while the cheese products of the present invention are characterized as being non-fat products, from a practical standpoint it is impossible to remove all butterfat from milk in ordinary commercial cream separation processes. Usually, a few tenths of a percent of butterfat remains in the skim milk after separating cream from the milk in the most efficient separators. When the skim milk is further concentrated, such as by removing whey during the cheese make procedures of the invention, the butterfat content is increased in proportion to the degree of concentration. The non-fat natural cheese products of the invention may contain up to about 1.7% fat. Therefore, the term "non-fat natural cheese product" as used herein, means natural cheese products which may contain up to about 1.7% butterfat.

Generally, in accordance with the invention, a non-fat milk solids source is acidified to a pH below the isoelectric point of casein. The non-fat milk solid source is a liquid which can be selected from skim milk, skim milk concentrated by evaporation, a skim milk retentate, reconstituted dried skim milk and mixtures thereof. Preferably, the non-fat milk solids are present in the non-fat milk solid source at a level of from about 5% to about 30%. All percentages used herein are by weight and all temperatures are degree Fahrenheit unless otherwise indicated.

The principal protein of non-fat milk solids, of course, is casein. Casein is a heterogeneous, phosphoprotein containing three electrophoretically distinct components designated, $\alpha$, $\beta$ and $\delta$ casein, in order of decreasing electromobility. These comprise, 80, 15 and 5% of whole casein, respectively, based on electrophoretic analysis. The casein components are colloidally distributed as polydispersed stable micellar aggregates in association with calcium and phosphate, and lesser amounts of manesium and citrate. The total complex is generally referred to as the calcium caseinate, calcium phosphate complex. The casein micelles may be considered as a swollen, microscopic polyelectrolyte gel, containing an excess of 66% water, of which approximately ¼ is chemically bound. Micelle size dispersion is modulated by a generally reversible equilibrium with the calcium, phosphate, citrate and magnesium ions in the milk serum.

In contrast to the milk serum proteins, i.e., whey protein, and native proteins generally, casein is markedly insoluble at its isoelectric point of pH 4.6, a value determined by solubility and electrophoretic activity. Although, electrophoretically, the isoelectric point is rather sharply defined, coagulation of milk is usually initiated by acidification to a pH of 5.3 and is complete as the pH passes through 4.7 to pH 4.6. For practical purposes, it is more appropriate to refer to a region of isoelectric precipitation of casein. Consequently, acidification of milk to pH 4.6 yields a coagulum of whole casein, inclusive of the various casein components that comprise the micelle. In the isoelectric state, the oppositely charged groups in casein are balanced by equal dissociation and the net free charge is eliminated. On the alkaline side of the isoelectric point, the negatively charged groups of casein predominate, evidenced by its mobility toward the anode under an applied electrical field. The converse situation, i.e., predominance of positively charged groups, prevails in casein solutions acidic with respect to the isoelectric value.

In accordance with the invention, the non-fat milk solids source is acidified to a pH below the isoelectric point of casein, that is, to a pH below about 4.6. While a coagulum forms at the isoelectric pH, the non-fat milk solid source may be maintained in a fluid condition by constant agitation as the pH is lowered through pH 4.6. The non-fat milk solids source is preferably acidified to a pH in the range of from about 3.8 to about 4.6, most preferably from about 4.1 to about 4.3. The pH may be lowered by fermentation with a lactic acid producing culture, such as S. lactis or by addition of a suitable edible acid, such as acetic acid, lactic acid, glucono delta lactone, hydrochloric acid and phosphoric acid.

In one embodiment of the invention, after the non-fat milk solids source has been acidified, a suitable gum is blended with the acidified non-fat milk solids source under conditions of high shear. Preferably, the gum is added through a powder funnel connected to a pump provided with a centrifugal rotor. The gum is metered into the acidified non-fat milk solid source as the source is pumped through the system. The gum is added at a level sufficient to provide a ratio of gum solids to protein in the range of from about 0.1:1 to about 0.5:1, preferably at a ratio of about 0.3:1.

The gum may be any of the edible hydrocolloid gums normally associated with the manufacture of food products. Suitable gums include xanthan gum, guar gum, the seaweed gums, such as agar and the various carrageenans, locust bean gum, tragacanth, pectin, gum karaya and carboxymethyl cellulose. The preferred gum, for reasons of cost and availability is xanthan gum. Various aspects of the invention may, therefore, be described utilizing xanthan gum as the preferred gum of the invention.

By "xanthan gum" is meant the heteropoly-saccharide produced by fermentation of the microorganism of the genus Xanthomonas. A discussion of the physical and chemical properties of xanthan gum may be found in Industrial Gums, R. L. Whistler, Ed., Academic Press, N.Y. (1973), p. 473.

Xanthan gum in aqueous solution with an appropriate counterion, such as sodium, is highly negatively charged because its side chains are composed of charged glucuronic acid, mannose and its pyruvate derivative. The structure of xanthan gum is set forth in U.S. Pat. No. 4,559,233 to Chen, et al.

In a subsequent step of the method of the invention, the gum/non-fat milk solids blend, after homogenization, is combined with a second non-fat milk solids source to provide the substrate of the invention which is used to produce a non-fat natural cheese. It has been determined that if the gum is added to the entire amount of a non-fat milk solids source required to produce the non-fat cheese, that the gum inhibits subsequent clotting of the non-fat milk solids source to provide a coagulum in the cheese make procedure. It is also not possible to use hydrated gum, i.e., a gum simply combined with water, prior to addition to the entire amount of non-fat milk solids source. Such hydrated gum passes out of the cheese make procedure with the whey drainage step.

While not wishing to be bound by any theory, it is believed that the highly negatively charged gum is caused to react with the casein having a predominance of positively charged groups at the pH of the first non-fat milk solids source during the subsequent homogenization step. In this connection, a particular type of homogenization is used to cause such interaction. It is believed that the interaction causes the complex gum structure to become dispersed in the casein network in much the same manner that fat particles are dispersed in the manufacture of cheese by conventional procedures using milk containing butterfat.

After the blend of xanthan gum and non-fat milk solids source has been formed, the blend is subjected to high energy, high shear mixing. This step may be effected at ambient temperatures. The blend, however, is preferably heated to a temperature of between about 90° F. to about 150° F., preferably from about 125° F. to about 145° F. At temperatures higher than the indicated range, crosslinking of protein can occur during the subsequent homogenization step. At temperatures lower than the indicated preferred range, the dispersion of xanthan gum in the casein is more difficult to obtain.

After heating, the blend of xanthan gum and non-fat milk solids source is passed through a suitable high shear, high energy mixing device. A suitable homogenization device is a Rannie homogenizer, manufactured by the Rannie Manufacturing Company of Denmark. The Rannie homogenizer may be operated at homogenization pressures of from about 2,500 psig to about 15,000 psig. Preferably, homogenization pressures of from about 9,000 psig to about 13,500 psig are used. While the high shear mixing step is described in terms of a homogenization step, any suitable high shear mixer capable of providing high shear, high energy properties may be used. For example, a commercial blender type mixer can be used, but long mixing times of 30 minutes to an hour are required to obtain the desired dispersion of the gum.

During passage through the high shear, high energy homogenizer at the preferred homogenization pressures, the temperature of the blend increases by an amount of from about 30° F. to about 45° F. It is generally desirable to repeat the high shear mixing step at least twice and preferably from two to four times. Therefore, the blend after exiting from the high shear mixing step is preferably cooled to within the range that it entered the high shear mixing device, i.e., at a temperature of from ambient to about 150° F. At homogenization pressures below about 9,000 psig, more repetitions are desirable and the homogenization step may be repeated as many times as are found to be necessary to obtain desired dispersion of the gum.

In another embodiment of the invention, the gum may be blended with water and subjected to high shear, high energy homogenization, as described hereinabove, prior to blending the gum with the acidified non-fat milk solids source. In this embodiment, the gum is added to the water at a level of from about 0.8% to about 1.5%. After being subjected to high shear, high energy homogenization, the aqueous gum blend is added to the acidified non-fat milk source with mild low shear mixing, such as with a propeller mixer, to cause the gum to become dispersed in the casein network as previously described. The homogenized, aqueous gum blend is added to the acidified non-fat milk source at a level sufficient to provide a ratio of gum solids to protein in the range of from about 0.1:1 to about 0.5:1, preferably at a ratio of about 0 3:1.

Figure 2:
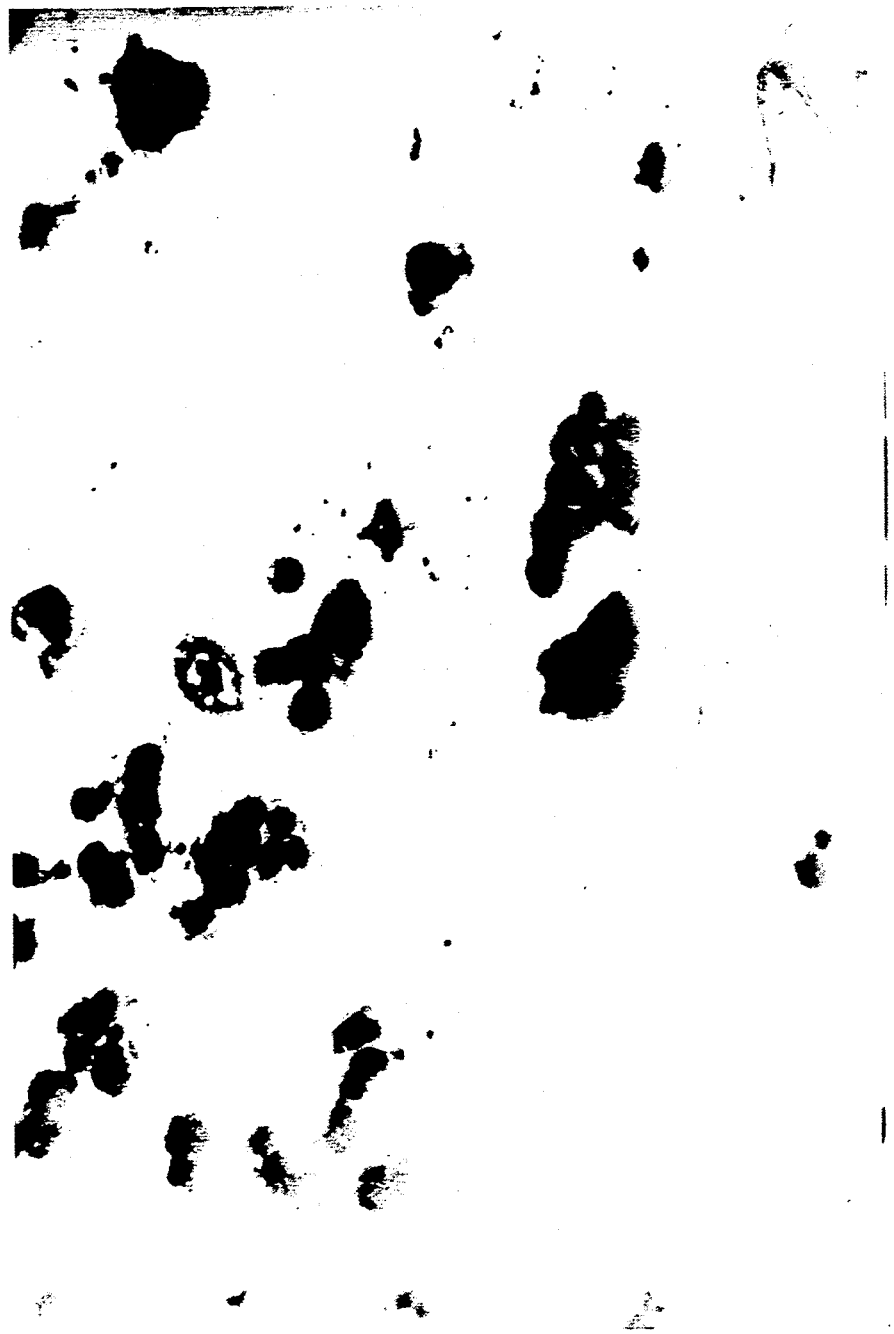
FIG. 2 is a microphotograph of the substrate made from the blend of a non-fat milk solids sources and xanthan gum after three passes through a high shear, high energy mixer.
Figure 3:
FIG. 3 is a photomicrograph of a thin section of a natural Cheddar cheese prepared from milk containing milk fat.
Figure 4:
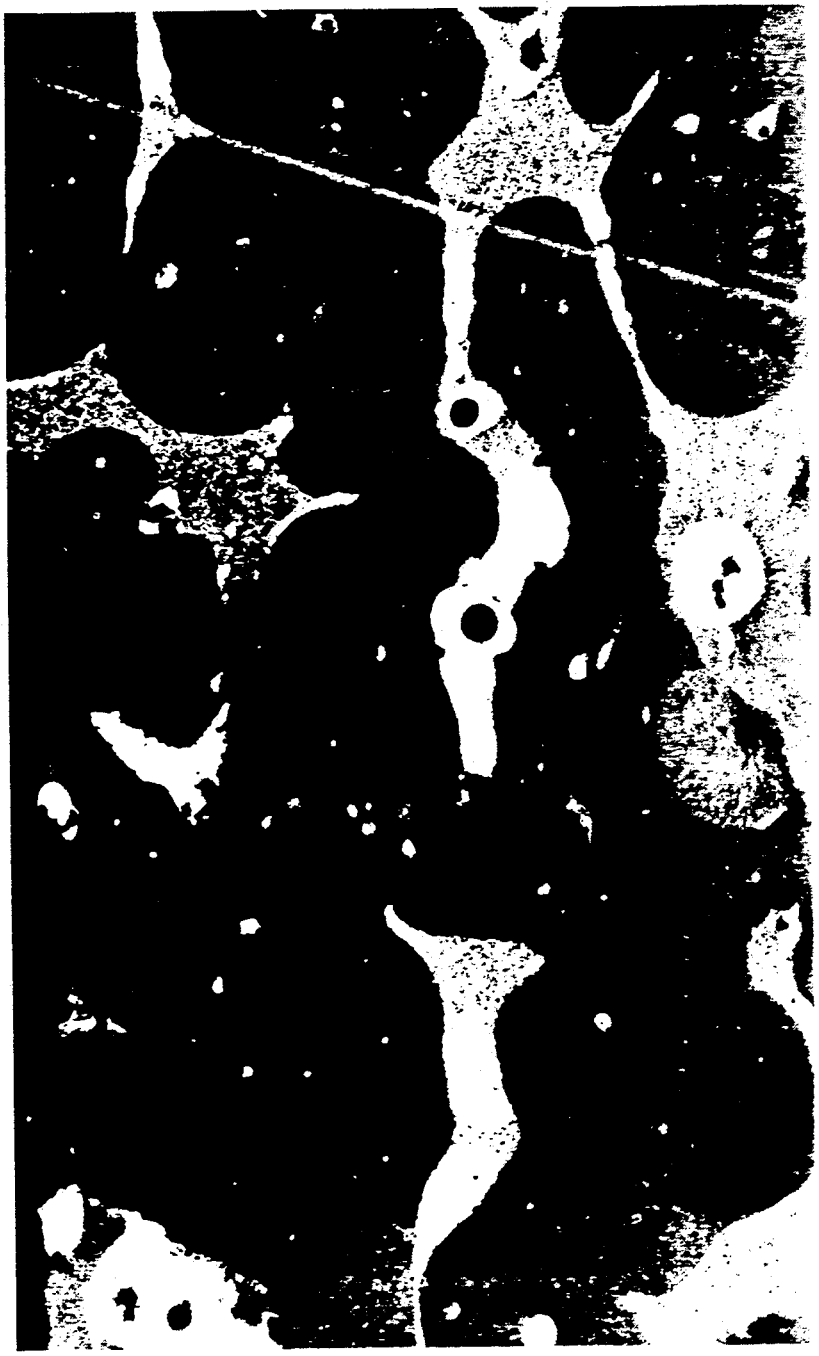
FIG. 4 is a photomicrograph of a thin section of a natural cheese made from the non-fat milk solids substrate of the invention.

As shown in FIG. 1, the non-fat milk solids source, after addition of the xanthan gum, but prior to high shear, high energy mixing is a loose network of large casein micelles interspersed throughout the milk serum. During the high shear mixing step, a casein/gum dispersion is formed which is highly stable. As shown in FIG. 2, after three passes through a Rannie homogenizer at 13,500 psig, the casein micelles are somewhat reduced in size and are uniformly dispersed throughout the milk serum, which is made highly stable by the presence of the gum. As shown in FIG. 4, the appearance of cheese made from the dispersion is much the same as that made from milk containing fat as shown in FIG. 3. The method of the present invention for providing a casein/gum dispersion is to be distinguished from the methods described in U.S. Pat. No. 4,855,156 to Singer, et al. and in PCT Application US89/01813. Both the method of the Singer patent and that of the PCT application are directed to providing microfragments of protein, in the case of the Singer patent, and microfragmented protein/gum fiber complexes, in the case of the PCT application.

The casein/gum dispersion obtained after the high shear, high energy mixing step of the invention is then combined with a second untreated non-fat milk solid source to provide a non-fat milk solids substrate which can be used to prepare non-fat natural cheese. The casein/gum dispersion is highly stable and can be held at refrigeration temperatures of 35° F. to 50° F. for a period of up to about two weeks prior to being combined with the second non-fat milk solids source. The second non-fat milk solid source can be skim milk, skim milk concentrated by evaporation, a skim milk retentate, reconstituted non-fat milk solids and mixtures thereof. The substrate preferably has from about 5% to about 30% total solids. Preferably, skim milk is used as the non-fat milk solids source for both the first acidified portion and for the second non-fat milk solids source which is combined with the casein/gum dispersion resulting from treatment of the first non-fat milk solids source. Skim milk has a total non-fat milk solids content in the range of about 8.25 to 9.3. A typical composition for skim milk is 90.5% water, 0.1% fat, 3.6% protein, 5.1% lactose and 0.7% ash.

The blend of dispersed gum and acidified non-fat milk solids source, whether obtained by homogenization of the gum in water or in the acidified non-fat milk solids source, is added to the second untreated non-fat milk solids source at a level sufficient to provide from about 0.05% to about 0.15% of gum in the non-fat milk solids substrate, based on the level of non-fat milk solids in the substrate.

The non-fat milk solids substrate of the invention can then be used to produce a non-fat natural cheese by any of the commonly used cheese producing procedures, such as those used in the manufacture of Swiss cheese, American-type cheese, such as Cheddar cheese, stirred curd cheese, washed curd cheese, Colby cheese and Monterey Jack, and by procedures used for the preparation of Pasta filata cheeses, such as Mozzarella.

In an important embodiment of the invention, a modified Swiss make procedure is used to prepare a non-fat natural cheese utilizing the non-fat milk solids substrate of the invention. In this procedure, the non-fat milk solids substrate is inoculated with the usual rod and coccus cultures used in the manufacture of Swiss cheese. A propionic acid producing culture, however, is not used. In this method, the rod and coccus cultures are added to the substrate at the normal levels wherein the coccus culture is added at a level of about 1000 times that of the rod culture. A suitable coccus culture is *S. thermophilus*. Suitable rod cultures are *L. bulgaricus*, *L. lactis* and *L. helveticus*. In accordance with the modified Swiss make procedure of the invention, the non-fat milk solids substrate is inoculated with the rod culture and the coccus culture and fermented for a period of about 30 minutes to an hour at a temperature of about 84° F. to about 90° F. A milk coagulating enzyme, such as rennet and calcium chloride are then added and a coagulum forms in about 30 minutes. The coagulum is cut into ⅛th inch to ¼ inch cubes. The cubes are stirred in the whey while the whey is heated to a temperature of from about 92° F. to about 126° F. over a period of about 30 minutes. The curd is stirred out at the elevated temperature for a period of 15 to 45 minutes. The curd and whey are then transferred to a universal cheese making apparatus (UCM) which is essentially a perforated drainer basket disposed within a solid wall container. The curd is pressed under whey for a period of about 15 to about 45 minutes. The whey is then drawn from the curd and the curd is retained in the UCM for a period of up to about 16 hours while pressure is applied to the curd. The curd block is then removed and transferred to a cold room maintained at a temperature of 35° F. to 45° F. and is held in the cold room for a period of up to about 30 days. The resulting cheese can then be further cured or can be cut and packaged into suitable size shapes at this point.

The resulting cheese has a mild, American-type cheese flavor and is a highly desirable cheese product having texture, flavor and organoleptic properties similar to that of natural cheese produced from fat-containing milk.

The following examples further illustrate various features of the present invention, but are intended to in no way limit the scope of the invention which is defined in the appended claims.

EXAMPLE 1

A non-fat milk solids substrate was prepared in accordance with the invention. Skim milk was pasteurized and inoculated with an *S. thermophilus* culture. The skim milk was fermented to a pH of about 4.3. The acidified skim milk was blended with xanthan gum using a powder funnel feeding a centrifugal rotor pump. The xanthan gum was added to the skim milk at a ratio of 0.3:1 of active xanthan solids to protein in the skim milk. The blend of skim milk and xanthan gum was heated to a temperature of 140° F. The blend of xanthan gum and skim milk was then passed through a Rannie homogenizer three times at a pressure of 13,500 psig. During each pass, the blend was heated by passage through the homogenizer from a temperature of 140° F. to a temperature of 175° to 180° F. and was cooled between each pass to 140° F. prior to the next passage through the Rannie homogenizer. A casein/gum dispersion was obtained after the three passes through the Rannie homogenizer.

The casein/gum dispersion was then combined with skim milk at a level of 12% of the casein/gum dispersion and 88% of pasteurized skim milk to provide a non-fat milk solids substrate having 9% total solids.

The non-fat milk solids substrate was used to produce cheese in accordance with the following procedures:

EXAMPLE 2

The non-fat milk solids substrate of Example 1 was used to produce a cheese in accordance with the modified Swiss make procedure of the invention. 500 pounds of the non-fat milk solids substrate was inoculated with 7.5 lbs of S. thermophilus and 10 ml of L. bulgaricus. The substrate had been warmed to a temperature of 88° F. The inoculated skim milk was fermented for a period of 45 minutes and rennet was added at a level of 50 ml of rennet. A coagulum formed in 30 minutes. The coagulum was cut into ¼-½ inch cubes to provide curd particles in whey. The curd cubes were stirred in the whey as the temperature was increased to 110° F. over a period of 30 minutes. The curd particles were then stirred out at the elevated temperature of 110° F. for 30 minutes. The curd and whey were then transferred to a UCM and the curd was pressed under the whey for a period of 30 minutes. They whey was drawn and the curd remained in the UCM for a period of 16 hours. The curd block was removed and transferred to a cold room maintained at 35°-40° F. The curd remained in the cold room for a period of 30 days and was then removed and cut into consumer size blocks and wrapped for distribution.

The resulting cheese was full bodied and had a mild flavor associated with a natural full-fat Colby cheese. The cheese had no bitterness and the texture, flavor and organoleptic properties were similar to those associated with natural cheese produced from milk containing fat.

EXAMPLE 3

A Mozzarella cheese was produced using the non-fat milk solids substrate of Example 1. In accordance with the method, the substrate pH was reduced to within the range of 5.2-5.5 by the addition of acetic acid. The substrate was set by the addition of rennet and calcium chloride while the substrate was maintained at a temperature of 88° F. 500 lbs of the acidified substrate was used to which was added 10 ml of rennet and 40 mg of $CaCl_2$. The coagulum was cut to provide curd and whey and the whey was heated to a temperature of 96° F. The curd was stirred out in the whey for a period of 30 minutes. The curd was allowed to settle and the whey was drained from the curd resulting in the formation of a curd block. The curd block was cut into pieces and the pieces were milled and transferred to a twin auger screw conveyor-cooker inclined at an angle of 45°. Hot water was maintained in the lower portion of the cooker at a temperature of 130° to 160° F. The retention time of the curd as it was transferred and worked in the cooker-conveyor was about 1 minute. The worked curd exiting from the cooker-conveyor was run into a molding machine and formed into 1 pound shapes of the desired size. The Mozzarella shapes were placed in a brine tank for a period of about 3 hours and were then removed and packaged.

The resultant Mozzarella cheese resembled part skim natural Mozzarella cheese in flavor, texture and organoleptic properties.

EXAMPLE 4

Xanthan gum was added to 100 pounds of water at a level sufficient to provide a solution having 1% of xanthan gum. The xanthan gum solution was then subjected to high shear, high energy homogenization as described in Example 1 starting at a temperature of 140° F. and using three passes through the homogenizer.

The homogenized aqueous solution of xanthan gum was then blended with skim milk which had been acidified to a pH of 4.2 with vinegar. The homogenized aqueous gum solution was added at a level to obtain 0.3 parts of gum to 1 part of protein the skim milk. The skim milk was stirred with a Lightning$^{TM}$ propeller mixer as the aqueous solution of gum was added.

The mixture of xanthan gum and acidified skim milk was then added to pasteurized, non-acidified skim milk to provide a non-fat milk solids substrate having 0.008% of xanthan gum in the substrate (0.084% based on the weight of the non-fat milk solids in the skim milk).

The procedure of Example 2 was then used to produce a natural cheese which had substantially similar properties to the cheese produced in Example 2.

While the method of the present invention for the manufacture of a non-fat natural cheese has been described with respect to particular operating parameters, it is apparent that the method is susceptible to a wide variation and a variety of conditions to provide the non-fat natural cheese product of the invention. Such variations are considered within the scope of the claims appended hereto.

What is claimed is:

1. A method for making a non-fat milk solids substrate suitable for manufacture of natural cheese comprising
   (a) acidifying a first liquid non-fat milk solids source to a pH below the isoelectric point of casein;
   (b) providing a blend of said acidified non-fat milk source and a gum;
   (c) subjecting said blend to high shear, high energy mixing to provide a dispersion of said gum in the casein of said non-fat milk solids source; and
   (d) combining said casein/gum dispersion with a second, non-acidified non-fat milk solids source to provide a non-fat milk solids substrate which can be used to prepare non-fat natural cheese.

2. A method in accordance with claim 1 wherein said gum is selected from the group consisting of xanthan gum, guar gum, agar, carrageenan, locust bean gum, tragacanth, pectin, gum karaya and carboxymethyl cellulose.

3. A method in accordance with claim 2 wherein said gum is xanthan gum.

4. A method in accordance with claim 1 wherein said first non-fat milk solids source is selected from the group consisting of skim milk, skim milk concentrated by evaporation, skim milk retentate, reconstituted dried skim milk and mixtures thereof.

5. A method in accordance with claim 1 wherein said second non-fat milk solids source is selected from the group consisting of skim milk, skim milk concentrated by evaporation, skim milk retentate, reconstituted dried skim milk and mixtures thereof.

6. A method in accordance with claim 1 wherein said pH of said first acidified non-fat milk solids source is in the range of 3.8 to 4.6.

7. A method in accordance with claim 1 wherein the pH of said acidified non-fat milk solids source is in the range of 4.1 to 4.3.

8. A method in accordance with claim 1 wherein said first non-fat milk solids source is acidified by fermentation with a lactic acid producing culture.

9. A method in accordance with claim 1 wherein said first non-fat milk solids source is acidified by addition of an edible acid to said skim milk.

10. A method in accordance with claim 9 wherein said edible acid is selected from the group consisting of acetic acid, lactic acid, glucono delta lactone, hydrochloric acid and phosphoric acid.

11. A method in accordance with claim 10 wherein said edible acid is acetic acid.

12. A method in accordance with claim 10 wherein said edible acid is lactic acid.

13. A method in accordance with claim 1 wherein said blend of said acidified non-fat milk solids source and said gum is heated to a predetermined temperature prior to said mixing step.

14. A method in accordance with claim 13 wherein said predetermined temperature is in the range of from about 90° F. to about 150° F.

15. A method in accordance with claim 13 wherein said predetermined temperature is in the range of from about 125° F. to about 145° F.

16. A method in accordance with claim 1 wherein said high shear, high energy mixing is by homogenization of said blend at a pressure of from about 9,000 psig to about 15,000 psig and the temperature of said blend increases by about 30° F. to about 45° F.

17. A method in accordance with claim 16 wherein said homogenization step is repeated for from 2 to 4 times.

18. A method in accordance with claim 16 wherein said blend is cooled to a temperature in the range of said predetermined temperature after said homogenization.

19. A method in accordance with claim 1 wherein said casein/gum dispersion comprises from about 5% to about 20% of said non-fat milk solids substrate.

20. A method in accordance with claim 1 wherein the ratio of said gum to the protein of said acidified non-fat milk solids source in said blend is from about 0.2:1 to about 0.4:1.

21. A method in accordance with claim 1 wherein the non-fat milk solids in said first and said second non-fat milk solids sources is from about 5% to about 30% by weight.

22. A method in accordance with claim 21 wherein said first and said second non-fat milk solids source has from about 9% to about 12% by weight of non-fat milk solids.

23. A method in accordance with claim 4 wherein said first non-fat milk solids source is skim milk.

24. A method in accordance with claim 5 wherein said second non-fat milk solids source is skim milk.

25. A method for making a non-fat milk solids substrate suitable for manufacture of natural cheese comprising (a) providing a blend of a gum and water;
(b) subjecting said blend to high shear, high energy mixing;
(c) combining said blend after said mixing with a first liquid non-fat milk solids source which has been acidified to below the isoelectric point of casein to provide a dispersion of said gum in the casein of said non-fat milk solids source; and
(d) combining said casein/gum dispersion with a second, non-acidified non-fat milk solids source to provide a non-fat milk solids substrate which can be used to prepare non-fat natural cheese.

26. A method in accordance with claim 25 wherein said gum is selected from the group consisting of xanthan gum, guar gum, agar, carrageenan, locust bean gum, tragacanth, pectin, gum karaya and carboxymethyl cellulose.

27. A method in accordance with claim 26 wherein said gum is xanthan gum.

28. A method in accordance with claim 25 wherein said first non-fat milk solids source is selected from the group consisting of skim milk, skim milk concentrated by evaporation, skim milk retentate, reconstituted dried skim milk and mixtures thereof.

29. A method in accordance with claim 25 wherein said second non-fat milk solids source is selected from the group consisting of skim milk, skim milk concentrated by evaporation, skim milk retentate, reconstituted dried skim milk and mixtures thereof.

30. A method in accordance with claim 25 wherein said pH of said first acidified non-fat milk solids source is in the range of 3.8 to 4.6.

31. A method in accordance with claim 25 wherein the pH of said acidified non-fat milk solids source is in the range of 4.1 to 4.3.

32. A method in accordance with claim 25 wherein said first non-fat milk solids source is acidified by fermentation with a lactic acid producing culture.

33. A method in accordance with claim 23 wherein said first non-fat milk solids source is acidified by addition of an edible acid to said skim milk.

34. A method in accordance with claim 31 wherein said edible acid is selected from the group consisting of acetic acid, lactic acid, glucono delta lactone, hydrochloric acid and phosphoric acid.

35. A method in accordance with claim 34 wherein said edible acid is acetic acid.

36. A method in accordance with claim 34 wherein said edible acid is lactic acid.

37. A method in accordance with claim 25 wherein said blend of said acidified non-fat milk solids source and said gum is heated to a predetermined temperature prior to said mixing step.

38. A method in accordance with claim 25 wherein said aqueous gum blend is heated to a predetermined temperature prior to said mixing step.

39. A method in accordance with claim 36 wherein said predetermined temperature is in the range of from about 90° F. to about 150° F.

40. A method in accordance with claim 36 wherein said predetermined temperature is in the range of from about 125° F. to about 145° F.

41. A method in accordance with claim 25 wherein said high shear, high energy mixing is by homogenization of said blend at a pressure of from about 9,000 psig to about 15,000 psig and the temperature of said blend increases by about 30° F. to about 45° F.

42. A method in accordance with claim 41 wherein said homogenization step is repeated for from 2 to 4 times.

43. A method in accordance with claim 41 wherein said blend is cooled to a temperature in the range of said predetermined temperature after said homogenization.

44. A method in accordance with claim 25 wherein said casein/gum dispersion comprises from about 5% to about 20% of said non-fat milk solids substrate.

45. A method in accordance with claim 25 wherein the ratio of said gum to the protein of said acidified non-fat milk solids source in said blend is from about 0.2:1 to about 0.4:1.

46. A method in accordance with claim 25 wherein the non-fat milk solids in said first and said second non-fat milk solids sources is from about 5% to about 30% by weight.

47. A method in accordance with claim 46 wherein said first and said second non-fat milk solids source has from about 9% to about 12% by weight of non-fat milk solids.

48. A method in accordance with claim 28 wherein said first non-fat milk solids source is skim milk.

49. A method in accordance with claim 29 wherein said second non-fat milk solids source is skim milk.

50. A method for manufacture of a non-fat natural cheese comprising
(a) providing a non-fat milk solids substrate in accordance with claim 1 or claim 25;
(b) inoculating said non-fat milk solids source with a culture system consisting of a coccus culture and a rod culture;
(c) forming a coagulum from said inoculated non-fat milk solids source and cutting said coagulum to provide curd and whey;
(d) stirring said curd in said whey; and
(e) recovering said curd from said whey and curing said curd to provide a natural cheese.

51. A method in accordance with claim 50 wherein said stirring step is conducted at a temperature of from about 92° F. to about 126° F.

52. A method in accordance with claim 50 wherein said curd is pressed under said whey prior to recovering said curd.

53. A method in accordance with claim 50 wherein said coccus culture is *S. thermophilus*.

54. A method in accordance with claim 50 wherein said culture is selected from the group consisting of *L. lactis*, *L. bulgaricus* and *L. helveticus*.

55. A method in accordance with claim 50 wherein a milk coagulating enzyme is added to said inoculated non-fat milk solids source prior to forming said coagulum.

56. A method in accordance with claim 55 wherein said milk coagulating enzyme is rennet.

57. A method in accordance with claim 50 wherein said non-fat milk solids source is a non-fat milk solids substrate produced by the method of claim 1.

58. A method in accordance with claim 50 wherein said non-fat milk solids source is a non-fat milk solids substrate produced by the method of claim 25.

* * * * *